(12) United States Patent
Nakajima et al.

(10) Patent No.: US 7,522,474 B2
(45) Date of Patent: Apr. 21, 2009

(54) ULTRASONIC SENSOR HAVING COMPRESSIVELY DEFORMED SPRING RESILIENTLY ATTACHING SENSOR BODY AND BEZEL

(75) Inventors: Akira Nakajima, Okazaki (JP); Yasuhiro Kawashima, Okazaki (JP); Hiroyuki Kani, Okazaki (JP); Tadao Shimizu, Chita (JP)

(73) Assignee: Denso Corporation, Kariya (JP)

( * ) Notice: Subject to any disclaimer, the term of this patent is extended or adjusted under 35 U.S.C. 154(b) by 50 days.

(21) Appl. No.: 11/712,530

(22) Filed: Mar. 1, 2007

(65) Prior Publication Data

US 2007/0230274 A1 Oct. 4, 2007

(30) Foreign Application Priority Data

Mar. 15, 2006 (JP) .............................. 2006-071288
Mar. 15, 2006 (JP) .............................. 2006-071289

(51) Int. Cl.
*G01D 11/24* (2006.01)
(52) U.S. Cl. ...................................... 367/140; 367/188
(58) Field of Classification Search ................. 367/140, 367/188, 173, 165, 909; 73/661, 632; 340/435
See application file for complete search history.

(56) References Cited

U.S. PATENT DOCUMENTS 6,759,950 B2    7/2004  Nishimoto et al.

| 7,240,555 B2 * | 7/2007 | Kawashima .................. 367/99 |
| 7,398,687 B2 * | 7/2008 | Nakajima et al. .............. 73/661 |
| 7,428,187 B2 * | 9/2008 | Nakajima et al. ........... 367/188 |
| 2006/0021440 A1 | 2/2006 | Kawashima |
| 2006/0022844 A1 | 2/2006 | Kawashima |
| 2007/0220981 A1 * | 9/2007 | Nakajima et al. .............. 73/661 |
| 2007/0230273 A1 * | 10/2007 | Nakajima et al. ........... 367/140 |
| 2007/0230274 A1 * | 10/2007 | Nakajima et al. ........... 367/140 |

FOREIGN PATENT DOCUMENTS

| DE | 196 26 291 | 1/1998 |
| DE | 203 04 602 U1 | 9/2002 |
| EP | 1460391 A1 * | 9/2004 |
| JP | 05-346461 | 12/1993 |
| JP | 2004-253912 | 9/2004 |

OTHER PUBLICATIONS

German Official Action dated Apr. 21, 2008 issued in corresponding German application No. 10 2007 008744.8-35 with English translation.

* cited by examiner

*Primary Examiner*—Dan Pihulic
(74) *Attorney, Agent, or Firm*—Nixon & Vanderhye, PC (57) ABSTRACT

An ultrasonic sensor has a sensor body and a bezel having a metal spring attached on a side wall thereof for installation on a vehicle component. A free end of the metal spring is positioned to protrude from a through hole of the side wall, is pressed by a portion of the sensor body that is inserted in a hollow space of the bezel, and is pushed back by an opening face of the sensor body. In this manner, the bezel is firmly attached on the component and the sensor body is firmly attached on the bezel.

19 Claims, 11 Drawing Sheets

ULTRASONIC SENSOR HAVING COMPRESSIVELY DEFORMED SPRING RESILIENTLY ATTACHING SENSOR BODY AND BEZEL

CROSS REFERENCE TO RELATED APPLICATION

This application is based on and claims the benefit of priority of Japanese Patent Application No. 2006-71288 filed on Mar. 15, 2006, and of Japanese Patent Application No. 2006-71289 filed on Mar. 15, 2006, the disclosure of which is incorporated herein by reference.

FIELD OF THE INVENTION

The present invention relates to an ultrasonic sensor having an ultrasonic transducer that includes a piezoelectric element.

BACKGROUND INFORMATION

A conventional ultrasonic sensor has, for example, a sensor body with an ultrasonic transducer installed therein attached to the bumper of a vehicle. Ultrasonic waves are generated by the ultrasonic transducer and, by receiving reflection waves of the ultrasonic waves, an obstacle existing near the bumper is detected.

Figure 17:
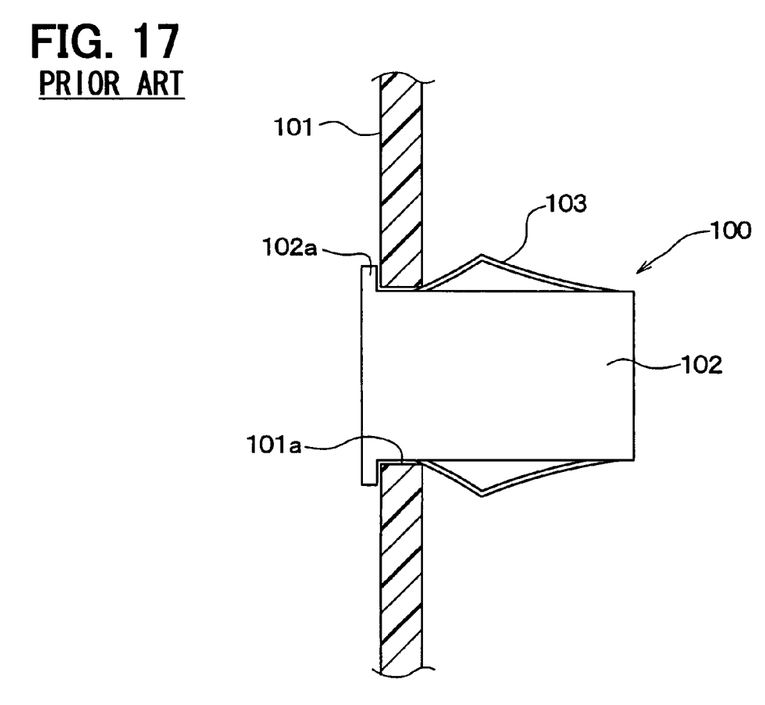
FIG. 17 shows an illustration of a conventional ultrasonic sensor disposed on a bumper.

FIG. 17 is a partial cross section showing a structure of fixing the conventional ultrasonic sensor 100 to a bumper 101. As shown in the diagram, a sensor body 102 of the ultrasonic sensor 100 has a circular column shape. By inserting the sensor body 102 in a circular hole 101a formed in the bumper 101 from the outside of the bumper 101, the sensor body 102 is fixed to the bumper 101. More practically, a flange 102a is provided at the rear end in the direction of insertion to the bumper 101 in the sensor body 102, and a V-shaped metal spring 103 is provided around the outer periphery of the sensor body 102. Consequently, when the sensor body 102 is inserted in the hole 101a in the bumper 101, in a state where movement in the insertion direction of the sensor body 102 is regulated by the flange 102a, the widening force in the radial direction of the sensor body 102 generated by the metal spring 103 is applied to the wall face constructing the hole 101a of the bumper 101, so that the sensor body 102 is firmly fixed to the bumper 101 (refer to, for example, U.S. Pat. No. 6,759,950).

In recent years, the ultrasonic sensor is becoming intelligent, and a circuit board on which not only an ultrasonic transducer but also a signal processing circuit and the like are formed is being housed in the sensor body. The sensor body is accordingly enlarged, and a problem occurs such that the sensor body cannot be inserted in the hole in the bumper from the outside of the bumper. Therefore, by a structure different from a conventional structure, the ultrasonic sensor has to be attached to the bumper.

To address the above-described problem, the inventors of the present invention have devised a structure in which a bezel (cover) formed in a cylindrical shape and having a flange at its one end is provided. The bezel is fixed by being inserted from the outside of the bumper into a hole in the bumper. After that, by inserting a circular column portion in which an ultrasonic transducer is disposed in the sensor body into the hollow in the bezel from the inside of the bumper (that is, in the direction opposite to the insertion direction of the bezel to the hole in the bumper), the sensor body is fixed to the bumper via the bezel.

In the case of such a structure, the large sensor body has to be held by the bezel functioning as a fixing member. Consequently, the bezel has to be firmly fixed to the bumper, and the sensor body has to be firmly fixed to the bezel.

The above-described problem also arises when the ultrasonic sensor is attached to a part of the vehicle that is different from a bumper in a vehicle body.

SUMMARY OF THE DISCLOSURE

In view of the problems, an object of the present disclosure is to provide an ultrasonic sensor having a bezel that is firmly attached to a vehicle part for firmly holding a body part of the ultrasonic sensor when the body part of the ultrasonic sensor is attached to the vehicle part such as a bumper or the like.

The ultrasonic sensor of the present disclosure includes a bezel in a pipe shape with an opening on one end and a hollow space housed therein, a sensor body having an insertion portion with an ultrasonic transducer disposed therein, and a spring. A side wall of the bezel has an opening of a through hole that connects an outside of the bezel and the hollow space, and the side wall of the bezel has the spring disposed at a position of the through hole. When the bezel is inserted into a hole portion of a vehicle component from an outside of the component before having the insertion portion of the sensor body being inserted from an inside of the component into the hollow space of the bezel, the spring is compressively deformed by an outer wall of the insertion portion and a wall face of the hole portion, thereby generating a reactive force that resiliently attaches the sensor body and the bezel on the wall face of the hole portion.

In this case, a metal spring may be used as the spring, and a free end of the metal spring may protrude from the through hole to apply the reactive force to the wall face of the hole portion.

Further, a flange may be disposed on the bezel at its rear end relative to the insertion direction into the component, and the flange may contribute to the attachment of the bezel on the component.

Furthermore, the flange may define a space between an outer face of the component, and the spring may protrude from the outer face into the space. In this manner, the spring may effectively contribute to the attachment of the bezel on the component.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention will be described below with reference to the drawings. In the following embodiments, the same reference numerals are assigned to parts which are the same or equivalent to each other in the drawings.

First Embodiment

An ultrasonic sensor according to a first embodiment of the invention will be described. An ultrasonic sonar of the present embodiment is attached to, for example, a bumper of a vehicle and is used as a back sonar or a corner sonar.

Figure 1:
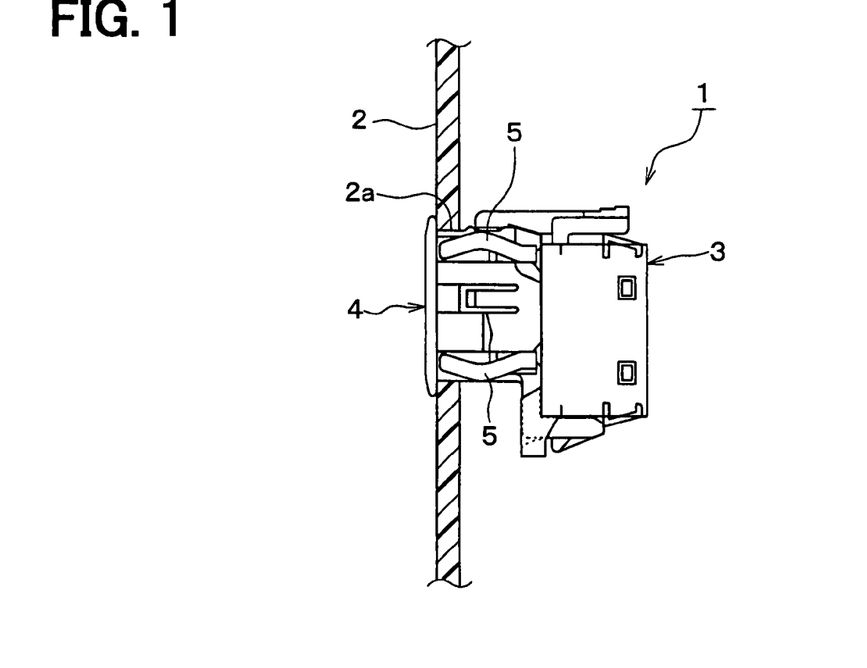
FIG. 1 shows a side view of an ultrasonic sensor attached to a bumper in a first embodiment of the present disclosure.

FIG. 1 is a side view showing a state in which an ultrasonic sensor 1 of the embodiment is attached to a bumper 2. In FIG. 1, only the bumper 2 is shown as a section.

As shown in the diagram, the ultrasonic sensor 1 is fixed in a hole 2a in the bumper 2. The ultrasonic sensor 1 has a configuration including the sensor body 3 and a bezel 4. The bezel 4 is inserted into the hole 2a in the bumper 2 from the outside of the bumper 2 (i.e., from the left side of the drawing) and, after that, the sensor body 3 is inserted into the hollow in the bezel 4 from the inside of the bumper 2 (i.e., from the right side of the drawing), thereby fixing the ultrasonic sensor 1 to the bumper 2.

The detailed structure of the sensor body 3 and the bezel 4 will be described below.

Figure 2A:
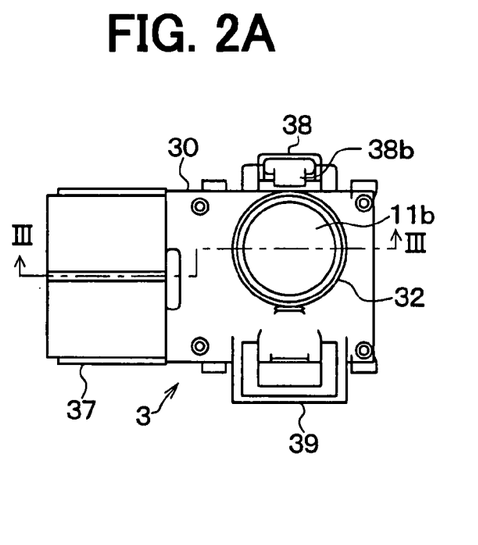
FIGS. 2A to 2D show illustrations of the ultrasonic sensor in a front/right side/top/rear view in the first embodiment.
Figure 2B:
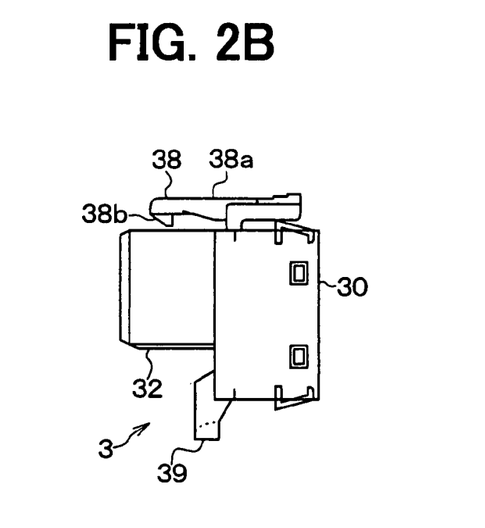
Figure 2C:
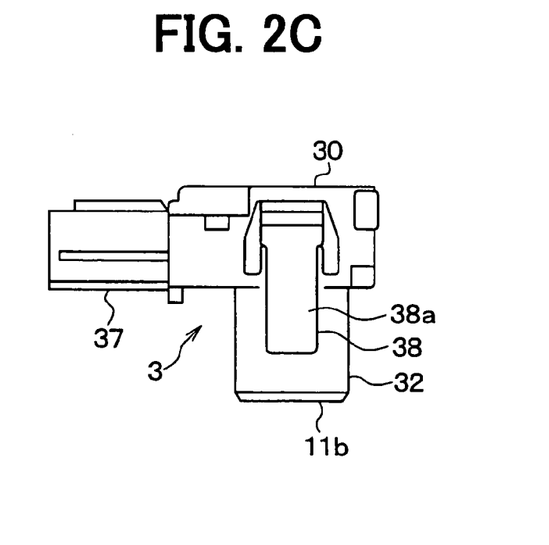
Figure 2D:
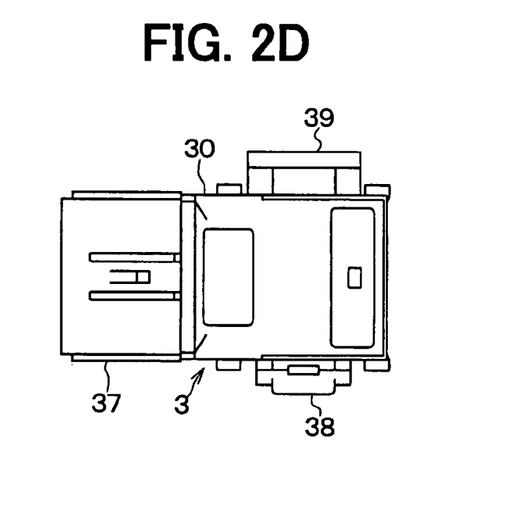
Figure 3:
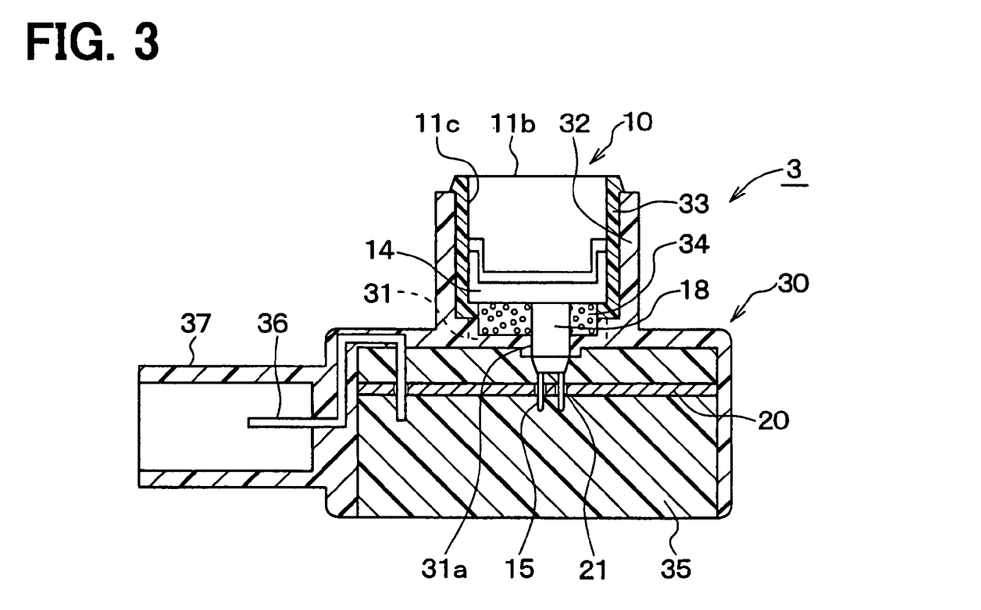
FIG. 3 shows a cross-sectional view of the ultrasonic sensor taken along a line III-III in FIG. 2A in the first embodiment.

FIGS. 2A to 2D are front view, right side view, top view, and rear view, respectively, of the sensor body 3. FIG. 3 is a cross section of the sensor body 3, which is taken along a line III-III in FIG. 2A.

Figure 4:
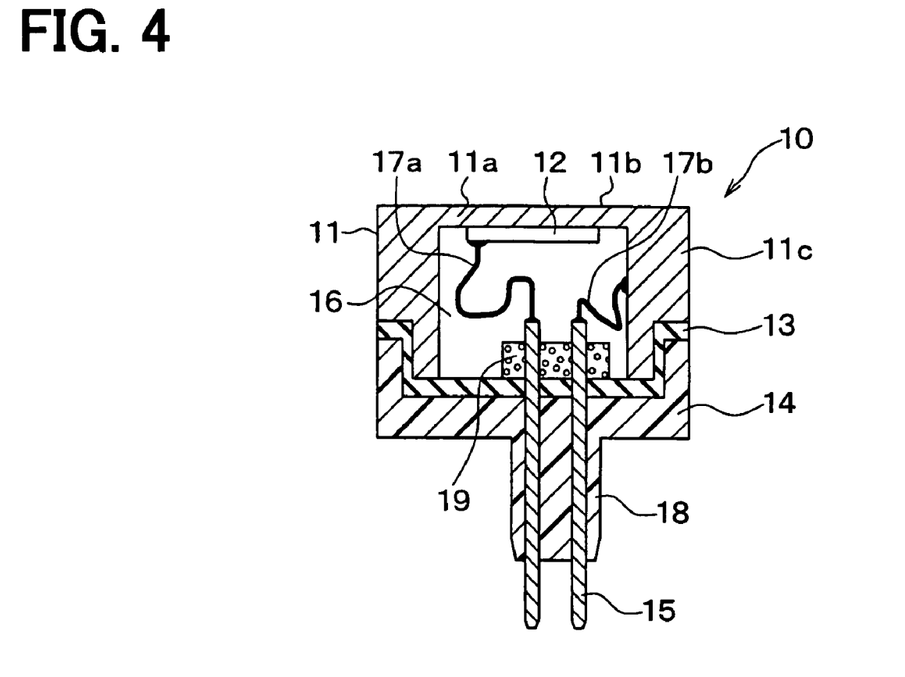
FIG. 4 shows a cross-sectional view of an ultrasonic transducer in the first embodiment.

In the sensor body 3, as shown in FIGS. 2A to 2D and FIG. 3, an ultrasonic transducer 10 and a circuit board 20 are integrally enclosed in a case 30. FIG. 4 is a cross section of the ultrasonic transducer 10 provided for the sensor body 3. As shown in FIG. 4, the ultrasonic transducer 10 has a housing 11, a piezoelectric element 12, a spacer 13, a base 14, and a connection pin 15.

The housing 11 is made of a conductive material (a metal material or an insulating material having a surface on which a conductive film is formed). The housing 11 has a bottomed cylindrical shape and an internal space 16 is formed in the housing 11. The piezoelectric element 12 is adhered to the inner face of a bottom 11a of the housing 11, and the outer surface of the bottom 11a serves as a vibration face 1b. In the embodiment, aluminum is used as the conductive material, and the vibration face 11b has a circular shape.

The piezoelectric element 12 is made of piezoelectric ceramics (for example, lead zirconate titanate) and is provided with electrodes (not shown) on its front surface and rear surface. One of the electrodes of the piezoelectric element 12 is electrically connected to one of the connection pins 15 of the pair via a lead 17a. The other electrode of the piezoelectric element 12 is adhered to the bottom 11a of the housing 11 by, for example, a conductive adhesive, connected to a lead 17b via the housing 11 made of the conductive material and, after that, electrically connected to the other connection pin 15. The internal space 16 of the housing 11 is filled with felt or silicon so that unnecessary vibrations transmitted from the vibration surface to the connection pins 15 are suppressed.

The spacer 13 is disposed between the opening in the housing 11 and the base 14. The spacer 13 is an elastic member for suppressing transmission of the unnecessary vibrations generated in a cylindrical portion 11c of the housing 11 in association with vibrations of the bottom 11a of the housing 11 to the base 14 to which the connection pins 15 are fixed. The spacer 13 is made of, for example, silicon rubber. Although the configuration of disposing the space 13 is used in the present embodiment, a configuration having no spacer 13 can be also employed.

The base 14 is fixed to the housing 11 by being fit in the peripheral surface on the opening side of the housing 11. The base 14 is made of an insulating material such as a synthetic resin (for example, ABS resin). To the base 14, a protection portion 18 for covering the connection pins 15 is provided so as to project to the circuit board 20 side. The connection pins 15 are disposed so as to penetrate the protection portion 18. By insert-molding the connection pins 15 at the time of forming the base 14, a part of the connection pins 15 is buried and fixed in the base 14.

Each of the connection pins 15 is mainly made of a conductive material such as copper and is constructed by a rod member having a thickness of, for example, 0.5 mmφ (i.e., having the diameter of 0.5 mm).

Further, the ultrasonic transducer 10 has a foam elastic member 19 made of, for example, foam silicon. The foam elastic member 19 is used to suppress transmission of vibration to the base 14, and the connection pins 15 are disposed so as to penetrate also the foam elastic member 19.

The housing 11, spacer 13, base 14, and foam elastic member 19 are adhered to each other with an adhesive (such as silicon adhesive), thereby forming the ultrasonic transducer 10 as an integral structure.

By assembling the ultrasonic transducer 10 constructed as described above together with the circuit board 20 into the hollow case 30 made of the synthetic resin, the ultrasonic sensor 1 is constructed.

The case 30 is constructed by a hollow rectangular-parallelepiped shape. The case 30 has a guide 31 for positioning the connection pines 15 in a connection position in the circuit board 20. The guide 31 is constructed by a plate member which partitions the internal space of the case 30 into a space in which the ultrasonic transducer 10 is disposed and a space in which the circuit board 20 is disposed. The guide 31 has a positioning hole 31a into which the connection pins 15 and the protection portion 18 are inserted.

One face (the upper face in the drawing sheet in FIG. 3) of the case 30 is an open face 32 whose top face shape is a circular shape. By inserting the ultrasonic transducer 10 into the open face 32, the ultrasonic transducer 10 is assembled in the case 30. The outer peripheral surface of the ultrasonic transducer 10 is covered with a cylindrical elastic member 33, and a foam elastic member 34 as an elastic member that suppresses vibrations is disposed below the base 14 in the ultrasonic transducer 10. In a state in which the ultrasonic transducer 10 is assembled in the case 30, the connection pins 15 are inserted in the positioning hole 31a in the guide 31, and the tip portions of the connection pins 15 are inserted in through holes 21 formed in the circuit board 20. The tip portions of the connection pins 15 and the through holes 21 are electrically connected to each other by soldering or the like.

The vibration face 11b of the ultrasonic transducer 10 is exposed from the open face 32 of the case 30 and ultrasonic waves generated by the ultrasonic transducer 10 are transmitted to the outside of the case 30.

The cylindrical elastic member 33 is made of silicon rubber and is adhered to the outer peripheral surface of the ultrasonic transducer 10 (the surface of the cylindrical portion 11c of the housing 11) and the bottom face of the ultrasonic transducer 10 in order to suppress transmission of unnecessary vibrations from the ultrasonic transducer 10 to the case 30.

Like the foam elastic member 19 disposed in the housing 11 of the ultrasonic transducer 10, the foam elastic member 34 is made of silicon foam, and the connection pins 15 and the protection portion 18 are disposed so as to penetrate the foam elastic member 34. There is a cut portion in the foam elastic member 34, and the protection portion 18 can be inserted in the cut portion. The ultrasonic transducer 10 (base 14), the cylindrical elastic member 33, and the foam elastic member 34 are fixedly adhered to each other by a silicone adhesive.

The hollow in which the circuit board 20 is disposed in the case 30 partitioned by the guide 31 is filled with a moisture-proof member 35. As the moisture-proof member 35, for example, a silicone resin or urethane resin can be applied. In the present embodiment, a silicone resin is applied. As shown in FIG. 3, an external output terminal 36 for output from the circuit board 20 to the outside is provided, and one end side of the external output terminal 36 is exposed from a connector 37 formed in one face of the case 30.

Further, as shown in FIGS. 2A to 2D, a lance 38 is provided on the top face (the upper side of the drawing in FIG. 2A) of the case 30, and a receiving part 39 is provided in the bottom face (the lower side of the drawing in FIG. 2A) of the case 30.

The lance 38 is a nail-shaped retaining part formed so as to project from the top face of the case 30 in the same direction as that of the open face 32, and is used for fixation to the bezel 4. More practically, the lance 38 has a rod part 38a and a nail part 38b. The rod part 38a is projected from the top face of the case 30 in the same direction as that of the open face 32, and the nail part 38b is formed on the open face 32 side in the tip position of the rod part 38a.

A receiving part 39 is a frame-shaped retaining part provided so as to project downward from the bottom face of the case 30, and is also used for fixation to the bezel 4. More practically, as shown in FIGS. 2A and 2D, the receiving part 39 has a square frame shape when viewed from the projection direction of the open face 32. A snap fit 4b provided for the bezel 4 which will be described later can be inserted in the hole in the receiving part 39.

The portion of the ultrasonic transducer 10 and the open face 32, in the sensor body 3 constructed as described above, that is, the cylindrical projected portion of the case 30 is an insertion portion to be inserted in the bezel 4. Therefore, the projection direction of the open face 32 is the insertion direction of the sensor body 3 to the bezel 4.

Figure 5A:
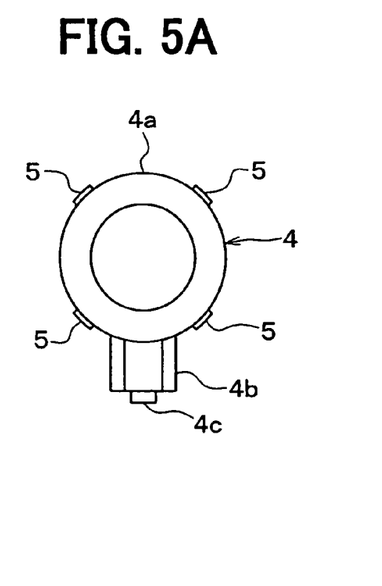
FIGS. 5A, 5B, 5C, 5D, 5E show illustrations of a front/left-side/rear/top/bottom view of a bezel in the first embodiment.
Figure 5B:
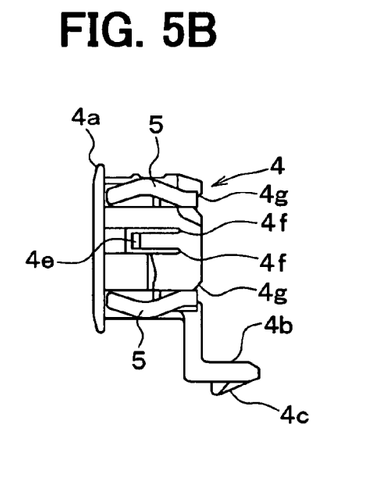
Figure 5C:
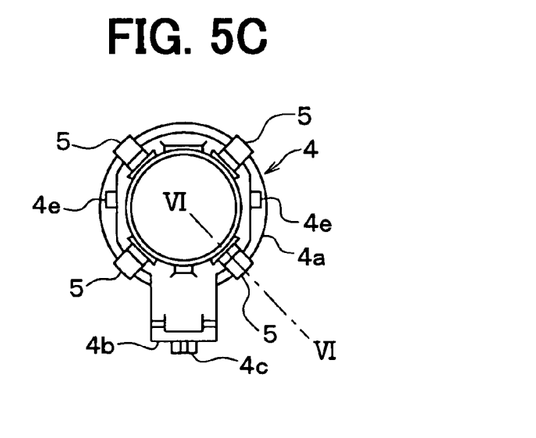
Figure 5D:
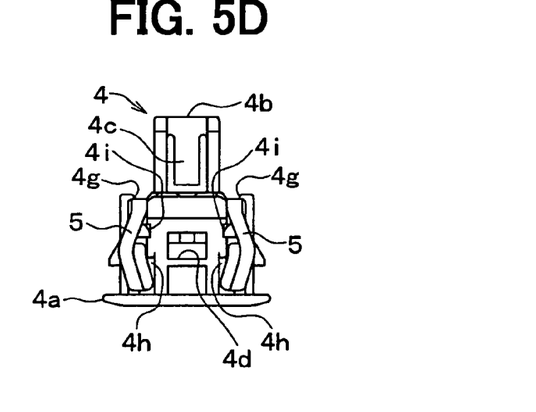
Figure 5E:
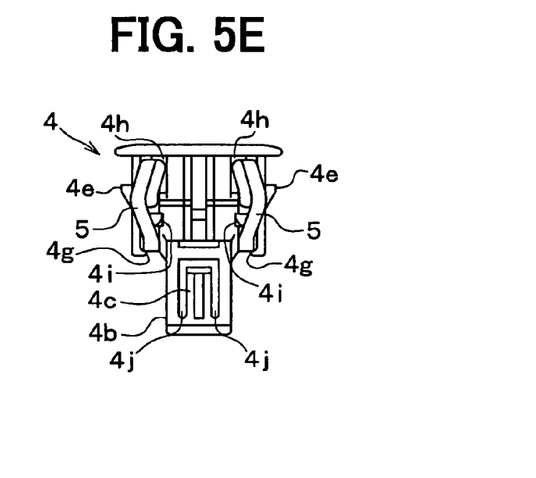
Figure 6:
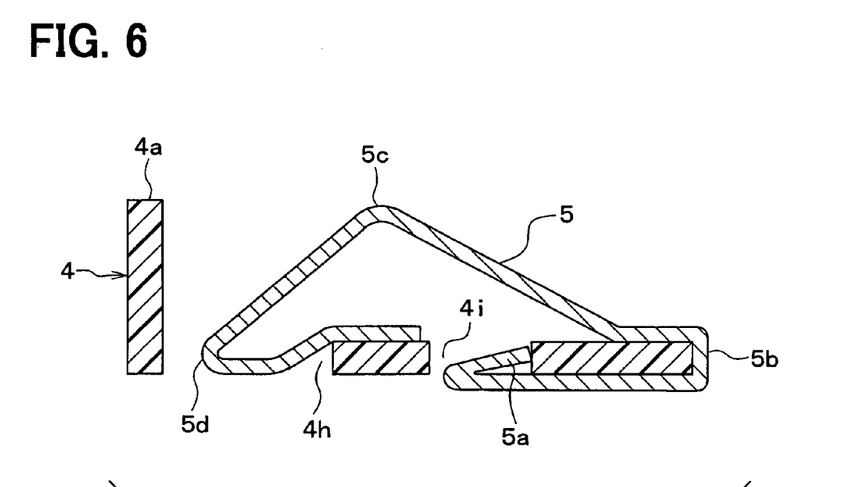
FIG. 6 shows a partially enlarged cross-sectional view of the bezel taken along a line VI-VI in FIG. 5C in the first embodiment.

FIGS. 5A, 5B, 5C, 5D, and 5E are a front view, left side view, rear view, top view, and bottom view, respectively, of the bezel 4. FIG. 6 is a partially enlarged cross section of the bezel 4, taken along a line VI-VI of FIG. 5C.

As shown in FIGS. 5A to 5E, the bezel 4 is constructed by an almost cylindrical member made of a material such as a resin or the like. A flange 4a whose diameter is partly enlarged is formed at one end of the bezel 4. The shape and size of the hollow of the bezel 4 correspond to those of the open face 32 in the sensor body 3. In the hollow, the open face 32 and the ultrasonic transducer 10 are inserted.

A snap fit 4b is provided for the under face of the bezel 4. The snap fit 4b functions as a nail-shaped retaining part. As shown in FIGS. 2A and 5B, by inserting a nail 4c formed at the tip of the snap fit 4b into the hole in the receiving part 39 of the case 30, the snap fit 4b is retained by the receiving part 39. With the configuration described above, the bezel 4 and the sensor body 3 are fixed more firmly. Slits 4j are formed on both sides of the nail 4c as shown in FIG. 5E, so that the nail 4c disposed between the slits 4j is susceptible to stress deformation.

A retaining hole 4d is formed in the top face of the bezel 4. The retaining hole 4d is a hole having a square shape when viewed from front, in which the nail 38b of the lance 38 provided for the case 30 is to be inserted. As shown in FIGS. 2B and 5D, when the nail 38b of the lance 38 is inserted in the retaining hole 4d, the nail 38b is retained by the inner wall of the retaining hole 4d. With the configuration described above, firmness of the fixation between the bezel 4 and the sensor body 3 is increased.

Retaining nails 4e are provided in positions on both right and left sides of the bezel 4 in the outer peripheral surface of the bezel 4. The retaining nails 4e are formed in positions that takes the thickness of the bumper 2 into consideration. Specifically, the retaining nails 4e are provided in positions apart from the end face of the flange 4a by the amount of the thickness of the bumper 2 or slightly larger. The retaining nails 4e are provided to prevent the bezel 4 from coming off from the bumper 2. After attaching the bezel 4 to the bumper 2, at the time of inserting the open face 32 of the case 30 in the sensor body 3 into the bezel 4, a force is applied in the direction that the bezel 4 comes off from the bumper 2. Consequently, when the bezel 4 is inserted in the bumper 2, the retaining nails 4e are retained by the end face of the bumper 2, so that the bezel 4 can be prevented from coming off from the bumper 2. As shown in FIG. 5B, the slits 4f are provided on both sides of each of the retaining nails 4e and the rod part between the slits 4f is susceptible to stress-deformation, so that the retaining nails 4e do not hinder insertion at the time of attachment to the bumper 2.

Further, in the bezel 4, a plurality of (in the present embodiment, four) grooves 4g are formed at equal intervals with respect to the center of the bezel 4. As shown in FIG. 6, through holes 4h and 4i in two positions arranged along the center axis of the bezel 4 are formed in each of the grooves 4g. In addition, a metal spring 5 is disposed along each of the grooves 4g. In this case, the through holes 4h and 4i may be formed as one hole. However, a wall may be provided between the holes 4h and 4i so as to increase a load from the metal spring 5. That is, when a tip portion of the metal spring 5 is held by the wall of the hole 4h, the metal spring 5 is prevented from being forced into the through hole 4h, thereby enabling an increase of the resilient force of the metal spring 5.

More practically, the metal spring 5 is formed by bending a thin rod-shaped metal. The metal spring 5 has a nail 5a obtained by bending one end of the rod-shaped metal in a nail shape, a U-shaped part 5b bent in a U shape in accordance with the shape of the end of the opening of the bezel 4, a projection part 5c projected in the radial direction from the outer peripheral surface of the bezel 4, and a folded part 5d obtained by folding the other end of the rod-shaped metal to the nail 5a side. When the nail 5a of the metal spring 5 is inserted from the open end of the bezel 4 until the U-shaped part 5b comes into contact with the open end of the bezel 4, the nail 5a enters the through hole 4i and is retained by the end face of the through hole 4i, thereby fixing the metal spring 5.to the bezel 4. Consequently, the side fixed to the bezel 4 of the metal spring 5, that is, the U-shaped part 5b serves as the fixing end, and the folded part 5d serves as the free end, thereby playing the spring function.

That is, at the free end of the metal spring 5, the side faces of the bumper 2 and the open face 32 in the sensor body 3 come into contact with the metal spring 5. The elastic force of the metal spring 5 is applied in the direction of spreading in the radial direction of the bezel 4 to the bumper 2. The elastic force of the metal spring 5 is applied in the contraction direction in the radial direction of the bezel 4 to the open face 32 in the sensor body 3.

Consequently, in the structure of fixing the sensor body 3 to the bumper 2 via the bezel 4, the bezel 4 can be firmly fixed to the bumper 2, and the sensor body 3 can be firmly fixed to the bezel 4. Thus, the ultrasonic sensor 1 can be firmly fixed to the bumper 2.

Figure 7:
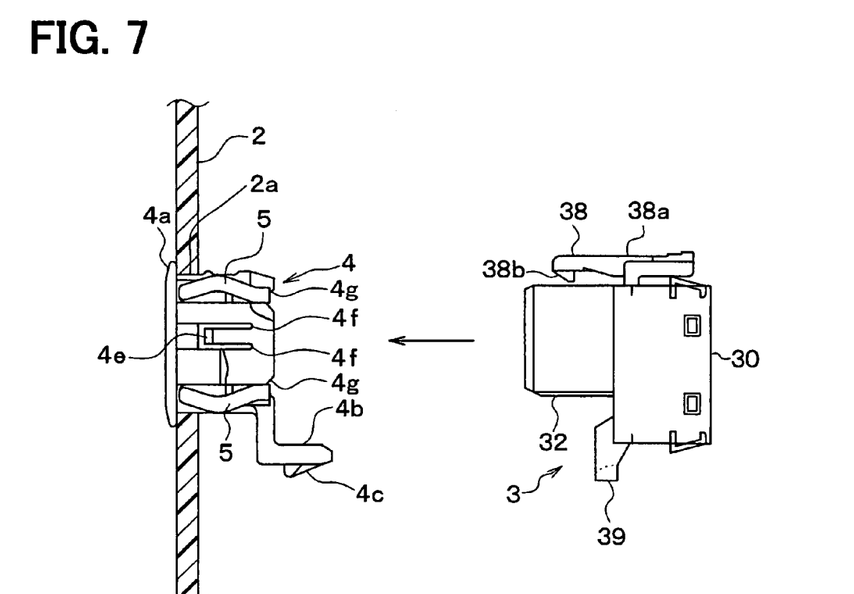
FIG. 7 shows an illustration of the ultrasonic sensor before attachment to the bumper in the first embodiment.

Next, a state where the ultrasonic sensor 1 is attached to the bumper 2 will be described. FIG. 7 is an illustration showing a state before attachment of the ultrasonic sensor 1 to the bumper 2.

Figure 8:
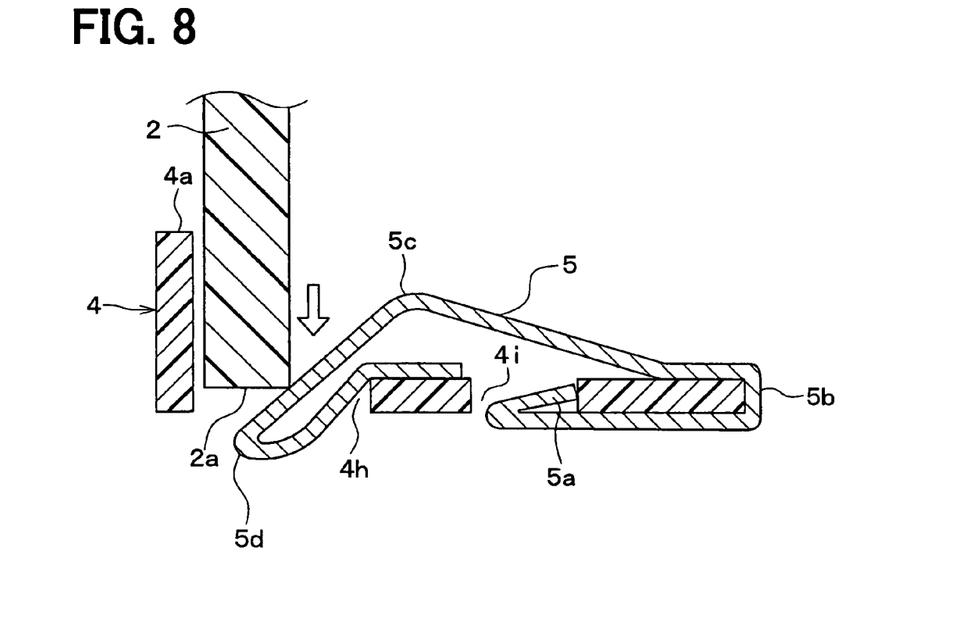
FIG. 8 shows a partial cross-sectional view of the bezel being inserted in a hole of the bumper in the first embodiment.

As shown in FIG. 8, first, the bezel 4 is inserted from one side of the bumper 2, that is, the outer side of the bumper 2 into the hole 2a in the bumper 2 until the retaining nail 4e fits in the bumper 2. The open end of the hole 2a in the bumper 2 and the inclined portion of the projection part 5c in the metal spring 5 come into contact with each other. FIG. 8 is a partially enlarged cross section showing the state at this time.

As shown in the illustration in FIG. 8, when the bezel 4 is inserted in the hole 2a in the bumper 2, the metal spring 5 is elastically deformed by the open end of the hole 2a in the bumper 2, and the folded part 5d as a free end of the metal spring 5 enters the through hole 4h thereby being projected out from the inner wall face of the bezel 4.

After that, as shown by the arrow in FIG. 7, the open face 32 and the ultrasonic transducer 10 in the sensor body 3 are inserted in the hollow of the bezel 4 from the other side of the bumper 2, that is, from the inside of the bumper 2. In this manner, a tip end of the snap fit 4b enters the hole in the receiving part 39, and the nail 4c between the slits 4j is inserted and engaged with the receiving part 39 due to a restoration from a deformation by the inner wall of the receiving part 39 after the nail 4c is elastically deformed by the inner wall of the receiving part 39 for insertion. In addition, the lance 38 engages the retaining hole 4d by having the nail 38b entered in the retaining hole 4d after deformation by abutment to the outer wall of the bezel 4 for insertion.

Figure 9:
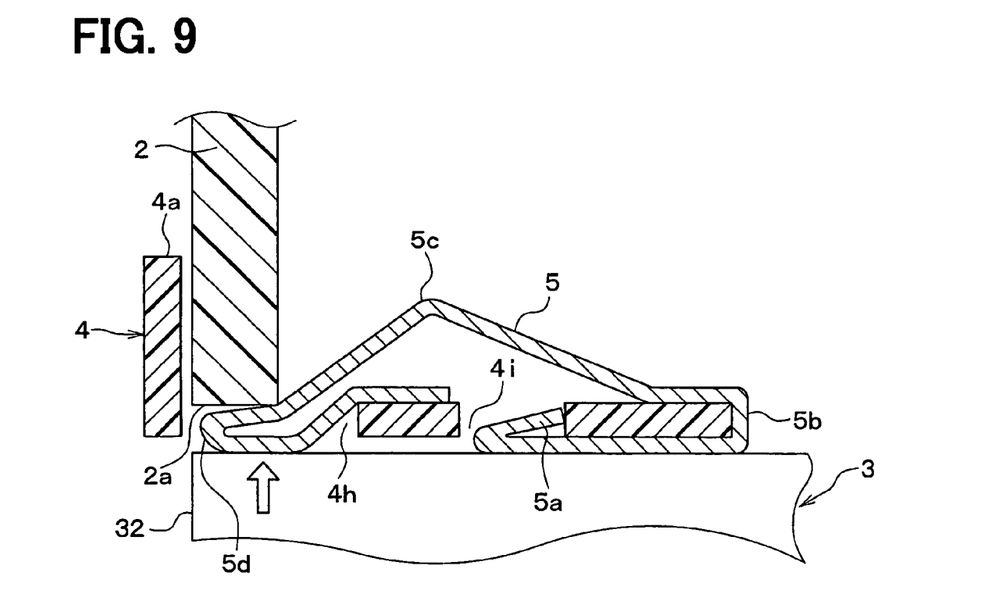
FIG. 9 shows a partial cross-sectional view of the bezel having an open face of a sensor body being inserted in a hollow thereof.

Further, the external wall face of the open face 32 and a portion of the free end of the metal spring 5 that protrudes toward the inner wall of the bezel 4 after entering the through hole 4h come into contact with each other. FIG. 9 shows a partially enlarged cross-sectional view of the bezel 4 having the open face 32 of the sensor body 3 being inserted in a hollow of the bezel 4.

As shown in the illustration, the free end of the metal spring 5 comes into contact with the external wall face of the open face 32, so that the free end is pushed back in the expanding direction in the radial direction of the bezel 4. Consequently, in the free end of the metal spring 5, the bumper 2 and the side face of the open face 32 in the sensor body 3 come into contact with the metal spring 5. To the bumper 2, the elastic force of the metal spring 5 is applied in the expanding direction in the radial direction of the bezel 4. The elastic force of the metal spring 5 is applied in the contracting direction of the radial direction of the bezel 4 to the open face 32 in the sensor body 3. That is, the free end of the metal spring 5 is elastically compressed between the external wall face of the open face 32 and the wall face of the hole 2a of the bumper 2. By elastic reaction force accompanying the compressive deformation of the metal spring 5, the sensor body 3 and the bezel 4 are fixed to the wall face of the hole 2a.

In this manner, in the structure in which the sensor body 3 is fixed to the bumper 2 via the bezel 4, the bezel 4 can be firmly fixed to the bumper 2, and the sensor body 3 can be firmly fixed to the bezel 4. Thus, the ultrasonic sensor 1 can be firmly fixed to the bumper 2.

Second Embodiment

Figure 10A:
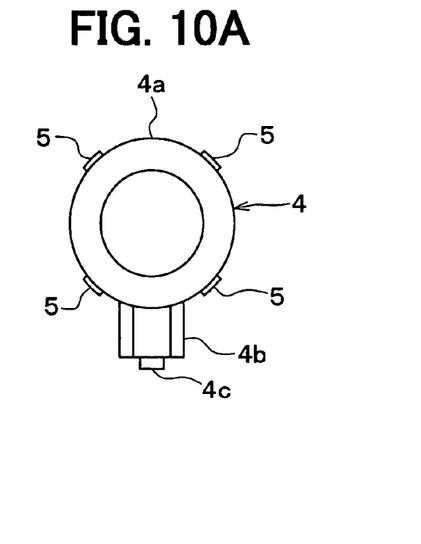
FIGS. 10A, 10B, 10C, 10D, 10E show illustrations of a front/left-side/rear/top/bottom view of the bezel in a second embodiment.
Figure 10B:
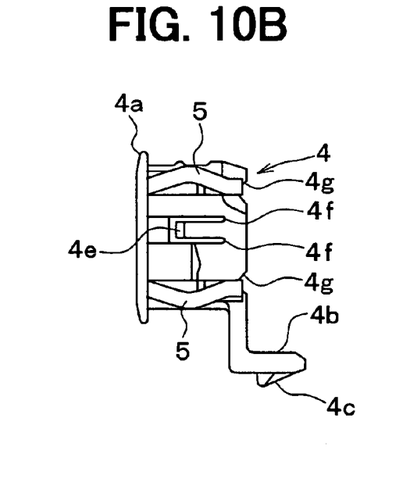
Figure 10C:
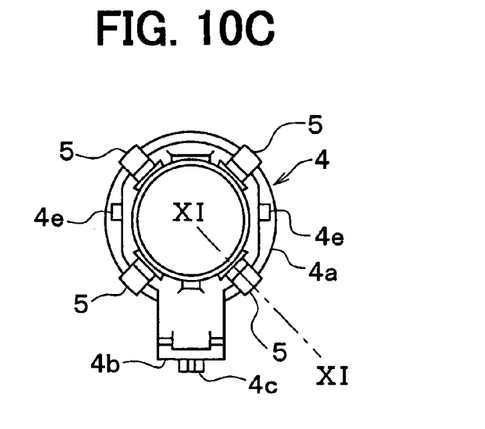
Figure 10D:
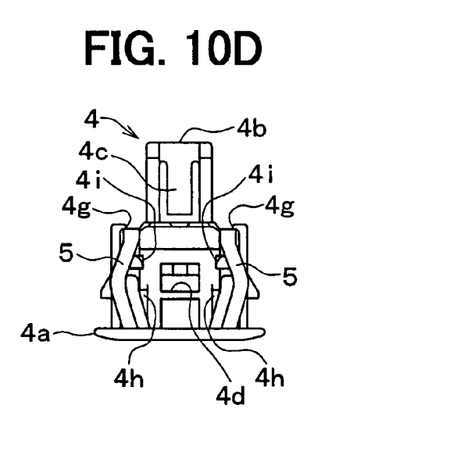
Figure 10E:
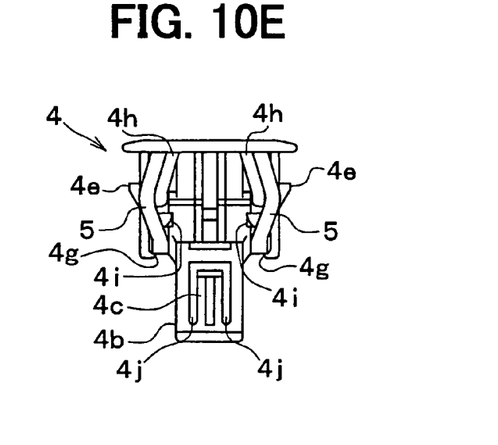
Figure 11:
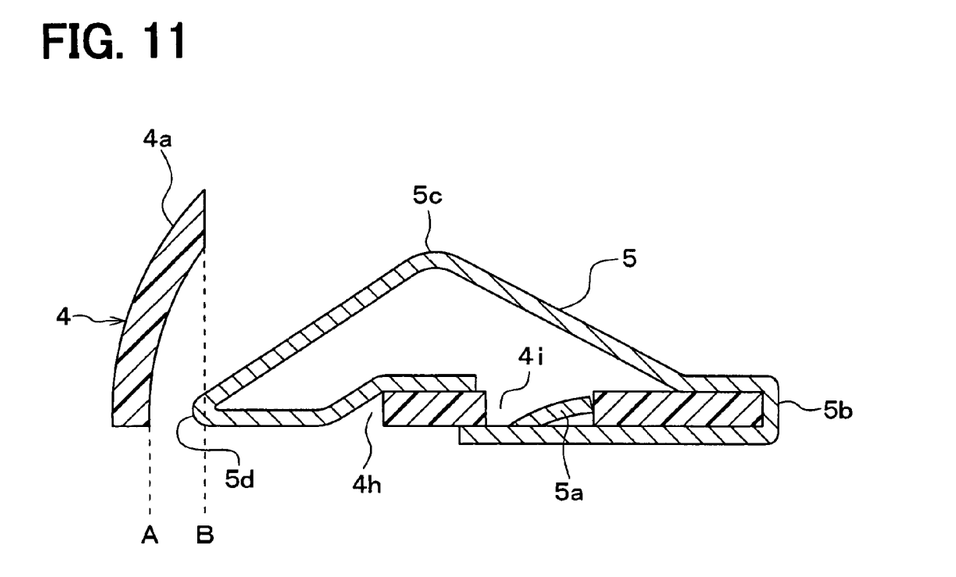
FIG. 11 shows a partially enlarged cross-sectional view of the bezel taken along a line XI-XI in FIG. 10C in the second embodiment.

FIGS. 10A, 10B, 10C, 10D, 10E are a front view, left-side view, rear view, top view, bottom view, respectively, of the bezel 4. FIG. 11 is a partially enlarged cross section of the bezel 4, taken along a line XI-XI of FIG. 10C.

As shown in FIGS. 10A to 10E, the bezel 4 is constructed by an almost cylindrical member made of a material such as a resin softer than a metal. A flange 4a whose diameter is partly enlarged is formed at one end of the bezel 4. The shape and size of the hollow of the bezel 4 correspond to those of the open face 32 in the sensor body 3. In the hollow, the open face 32 and the ultrasonic transducer 10 are inserted.

The flange 4a of the bezel 4 has a cross section in an arc shape, and a tip of the flange 4a has a contact with the bumper 2. More practically, a radially farthest portion of the flange 4a that extends outwardly from an axis of the cylindrical shape touches the bumper 2 on its surface. In this manner, a space between broken lines A and B in FIG. 11 is reserved in an area that is defined by the arc shape of the flange 4a and the surface of the bumper 2 when the tip of the flange 4a touches the surface of the bumper. The amount of protrusion, i.e., the distance between the lines A and B in a horizontal direction in FIG. 11, is determined according to the thickness of the bumper 2, and is preferably determined as an amount that is equal to or is greater than, for example, the dispersion of the thickness of the bumper 2 where the bezel 4 is fixed.

A snap fit 4b is provided for the under face of the bezel 4. The snap fit 4b functions as a nail-shaped retaining part. As shown in FIGS. 2A and 5B, by inserting a nail 4c formed at the tip of the snap fit 4b into the hole in the receiving part 39 of the case 30, the snap fit 4b is retained by the receiving part 39. With the configuration described above, the bezel 4 and the sensor body 3 are fixed more firmly. In addition, slits 4j are formed on both sides of the nail 4c, so that the nail 4c disposed between the slits 4j is susceptible to stress deformation.

A retaining hole 4d is formed in the top face of the bezel 4. The retaining hole 4d is a hole having a square shape when viewed from front, in which the nail 38b of the lance 38 provided for the case 30 is to be inserted. As shown in FIGS. 2B and 10D, when the nail 38b of the lance 38 is inserted in the retaining hole 4d, the nail 38b is retained by the inner wall of the retaining hole 4d. With the configuration described above, firmness of the fixation between the bezel 4 and the sensor body 3 is increased.

Retaining nails 4e are provided in positions on both right and left sides of the bezel 4 in the outer peripheral surface of the bezel 4. The retaining nails 4e are formed in positions that takes the thickness of the bumper 2 into consideration. Specifically, the retaining nails 4e are provided in positions apart from the end face of the flange 4a by the amount of the thickness of the bumper 2 or slightly larger. The retaining nails 4e are provided to prevent the bezel 4 from coming off from the bumper 2. After attaching the bezel 4 to the bumper 2, at the time of inserting the open face 32 of the case 30 in the sensor body 3 into the bezel 4, a force is applied in the direction that the bezel 4 comes off from the bumper 2. Consequently, when the bezel 4 is inserted in the bumper 2, the retaining nails 4e are retained by the end face of the bumper 2, so that the bezel 4 can be prevented from coming off from the bumper 2. As shown in FIG. 10B, the slits 4f are provided on both sides of each of the retaining nails 4e and the rod part between the slits 4f is susceptible to stress-deformation, so that the retaining nails 4e do not hinder insertion at the time of attachment to the bumper 2.

Further, in the bezel 4, a plurality of (in the present embodiment, four) grooves 4g are formed at equal intervals with respect to the center of the bezel 4 so as to extend from the outer face of the side wall of the bezel 4 to the inner face. As shown in FIG. 11, through holes 4h and 4i in two positions arranged along the center axis of the bezel 4 are formed in each of the grooves 4g. In addition, a metal spring 5 is disposed along each of the grooves 4g. In this case, the through holes 4h and 4i may be formed as one hole. However, a wall may be provided between the holes 4h and 4i so as to increase a load from the metal spring 5. That is, when a tip portion of the metal spring 5 is held by the wall of the hole 4h, the metal spring 5 is prevented from being forced into the through hole 4h, thereby enabling an increase of the resilient force of the metal spring 5.

The metal spring 5 is formed by bending a thin rod-shaped metal. The metal spring 5 has a nail 5a obtained by bending one end of the rod-shaped metal in a nail shape, a U-shaped part 5b bent in a U shape in accordance with the shape of the end of the opening of the bezel 4, a projection part 5c projected in the radial direction from the outer peripheral surface of the bezel 4, and a folded part 5d obtained by folding the other end of the rod-shaped metal to the nail 5a side. When the nail 5a of the metal spring 5 is inserted from the open end of the bezel 4 until the U-shaped part 5b comes into contact with the open end of the bezel 4, the nail 5a enters the through hole 4i and is retained by the end face of the through hole 4i, thereby fixing the metal spring 5 to the bezel 4. Consequently, the side fixed to the bezel 4 of the metal spring 5, that is, the U-shaped part 5b serves as the fixing end, and the folded part 5d serves as the free end, thereby playing the spring function.

More practically, at the free end of the metal spring 5, the side faces of the bumper 2 and the open face 32 in the sensor body 3 come into contact with the metal spring 5. The elastic force of the metal spring 5 is applied in the direction of spreading in the radial direction of the bezel 4 to the bumper 2. The elastic force of the metal spring 5 is applied in the contraction direction in the radial direction of the bezel 4 to the open face 32 in the sensor body 3.

Consequently, in the structure of fixing the sensor body 3 to the bumper 2 via the bezel 4, the bezel 4 can be firmly fixed to the bumper 2, and the sensor body 3 can be firmly fixed to the bezel 4. Thus, the ultrasonic sensor 1 can be firmly fixed to the bumper 2.

In the present embodiment, when the bezel 4 is inserted into the hole 2a of the bumper, the tip of the folded part 5d as a free end, i.e., a portion of the folded part 5d at the most flange 5a side, enters the space between the flange 5a and the surface of the bumper 2, thereby protruding from the bumper 2 toward an outside of the bumper 2.

In this manner, even when a contacting portion of the metal spring 5 on the wall of the hole 2a of the bumper 2 is changed, the metal spring 5 is resiliently deformed in the same manner so that the bezel 4 is fixed on the bumper 2 by the same amount of the resilient force from the spring 5.

Figure 12:
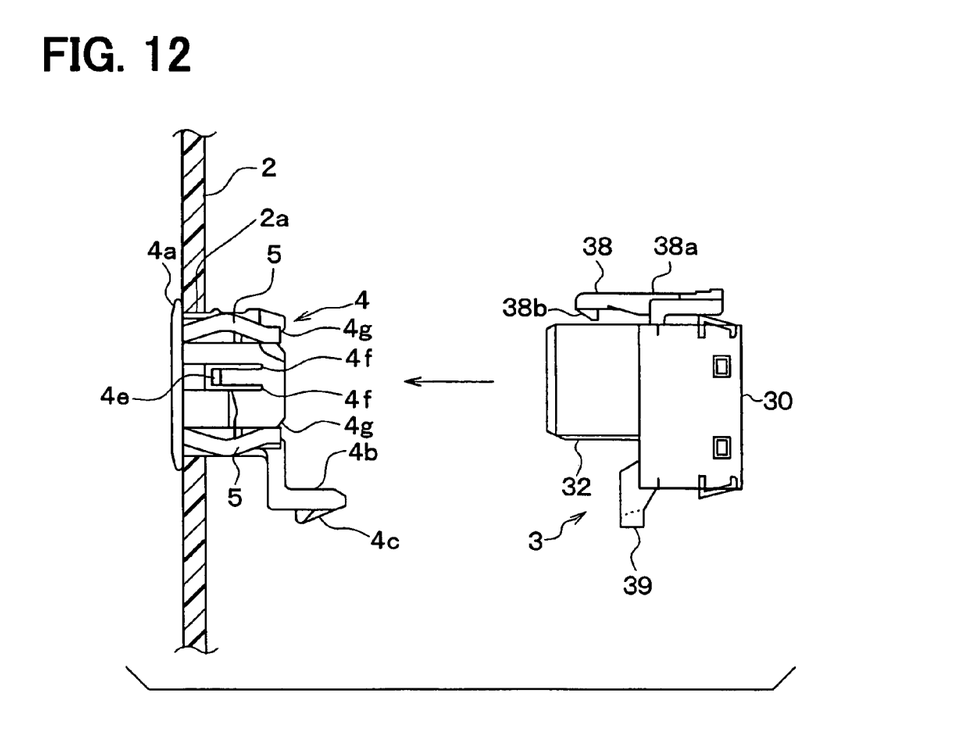
FIG. 12 shows an illustration of the ultrasonic sensor before attachment to the bumper in the second embodiment.

Next, a state where the ultrasonic sensor 1 is attached to the bumper 2 will be described. FIG. 12 is an illustration showing a state before attachment of the ultrasonic sensor 1 to the bumper 2.

Figure 13:
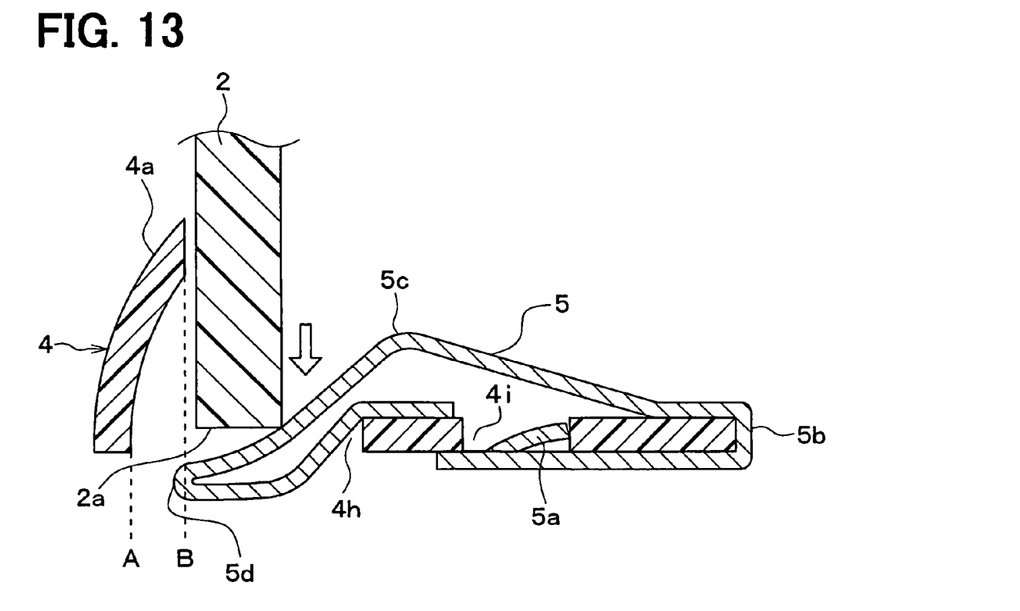
FIG. 13 shows a partial cross-sectional view of the bezel being inserted in a hole of the bumper in the second embodiment.

As shown in FIG. 12, first, the bezel 4 is inserted from one side of the bumper 2, that is, the outer side of the bumper 2 into the hole 2a in the bumper 2 until the retaining nail 4e fits in the bumper 2. The open end of the hole 2a in the bumper 2 and the inclined portion of the projection part 5c in the metal spring 5 come into contact with each other. FIG. 13 is a partially enlarged cross section showing the state of assembly at this point.

As shown in the illustration in FIG. 13, when the bezel 4 is inserted in the hole 2a in the bumper 2, the metal spring 5 is elastically deformed by the open end of the hole 2a in the bumper 2, and the folded part 5d as a free end of the metal spring 5 enters the through hole 4h and is projected out from the inner wall face of the bezel 4.

After that, as shown by the arrow in FIG. 12, the open face 32 and the ultrasonic transducer 10 in the sensor body 3 are inserted in the hollow of the bezel 4 from the other side of the bumper 2, that is, the inside of the bumper 2. In this manner, the tip end of the snap fit 4b enters the hole of the receiving part 39, thereby engaging the nail 4c and the receiving part 39 when the nail 4c between the slits 4j is pushed back by the inner wall of the receiving part 39 and is restored by resilience to go into the hole. Further, the lance 38 engages the retaining hole 4d when the rod part 38a of the lance 38 is pushed back for having the nail 38b to be placed in the retaining hole 4d.

Figure 14:
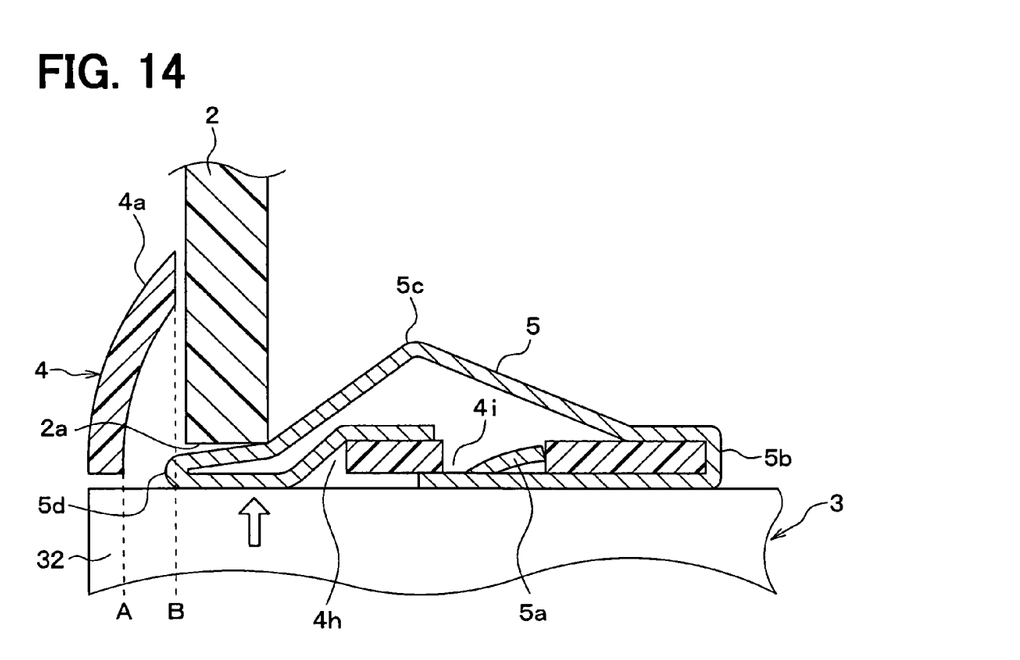
FIG. 14 shows a partial cross-sectional view of the bezel having an opening face of a sensor body being inserted in a hollow thereof in the second embodiment.

Further, the outer wall of the open face 32 and a portion of the free end of the metal spring 5 that enters the through hole 4h in the bezel 4 come into contact with each other. FIG. 14 shows a partially enlarged cross-sectional view of the bezel 4 having the open face 32 of the sensor body 3 being inserted in a hollow thereof.

As shown in the illustration, the free end of the metal spring 5 comes into contact with the external wall face of the open face 32, so that the free end is pushed back in the expanding direction in the radial direction of the bezel 4. Consequently, in the free end of the metal spring 5, the bumper 2 and the side face of the open face 32 in the sensor body 3 come into contact with the metal spring 5. To the bumper 2, the elastic force of the metal spring 5 is applied in the expanding direction in the radial direction of the bezel 4. The elastic force of the metal spring 5 is applied in the contracting direction of the radial direction of the bezel 4 to the open face 32 in the sensor body 3. That is, the free end of the metal spring 5 is elastically compressed between the outer wall face of the open face 32 and the wall face of the hole 2a of the bumper 2. By elastic reaction force accompanying the compressive deformation, the sensor body 3 and the bezel 4 are fixed to the wall of the hole 2a.

In this manner, in the structure in which the sensor body 3 is fixed to the bumper 2 via the bezel 4, the bezel 4 can be firmly fixed to the bumper 2, and the sensor body 3 can be firmly fixed to the bezel 4. Thus, the ultrasonic sensor 1 can be firmly fixed to the bumper 2.

The ultrasonic sensor 1 of the present embodiment having the space between the flange 4a and the bumper 2 with the tip of the free end of the metal spring 5 inserted therein has the advantage in the following manner.

That is, the structure of the metal spring 5 in the present embodiment inserts the folded part 5d into the space between the flange 4a and the bumper 2, thereby making the contact point between the metal spring 5 and the wall of the hole 2a in the bumper closer to the projection part 5c of the metal spring 5 by the amount that is equal to the thickness of the bumper 2 when the structure is compared with the structure that does not provides the space between the flange 4a and the bumper.

Therefore, the resilient force generated by the deformation of the metal spring 5 in the arrow direction in FIG. 14 becomes greater because the amount of the deformation of the metal spring 5 becomes greater when the contact point between the metal spring 5 and the wall of the hole 2a coming closer to the projection part 5c has an increased space for deformation. In other words, the change of the resilient force from the metal spring 5 according to the change of the thickness of the bumper 2 becomes smaller relative to the resilient force itself when the ratio of the resilient force to the change increases.

As a result, the bezel 4 is firmly fixed on the bumper 2, thereby enabling a firm fixation of the sensor body 3 on the bezel 4. That is, the ultrasonic sensor 1 is firmly fixed on the bumper 2.

In this manner, insufficiency and/or inappropriateness of the fixation of the bezel 4 on a vehicle body such as a bumper or the like due to the thickness of the vehicle body where the bezel 4 is disposed is prevented.

Although the present invention has been fully described in connection with the preferred embodiment thereof with reference to the accompanying drawings, it is to be noted that various changes and modifications will become apparent to those skilled in the art.

Figure 15A:
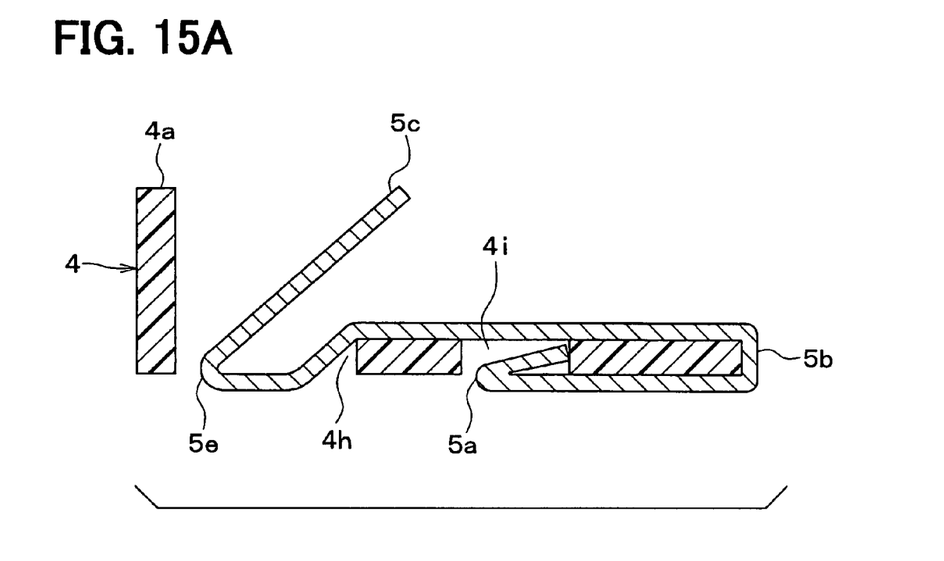
FIGS. 15A and B show partially enlarged cross-sectional views of the bezel in modifications of the first and the second embodiments.
Figure 15B:
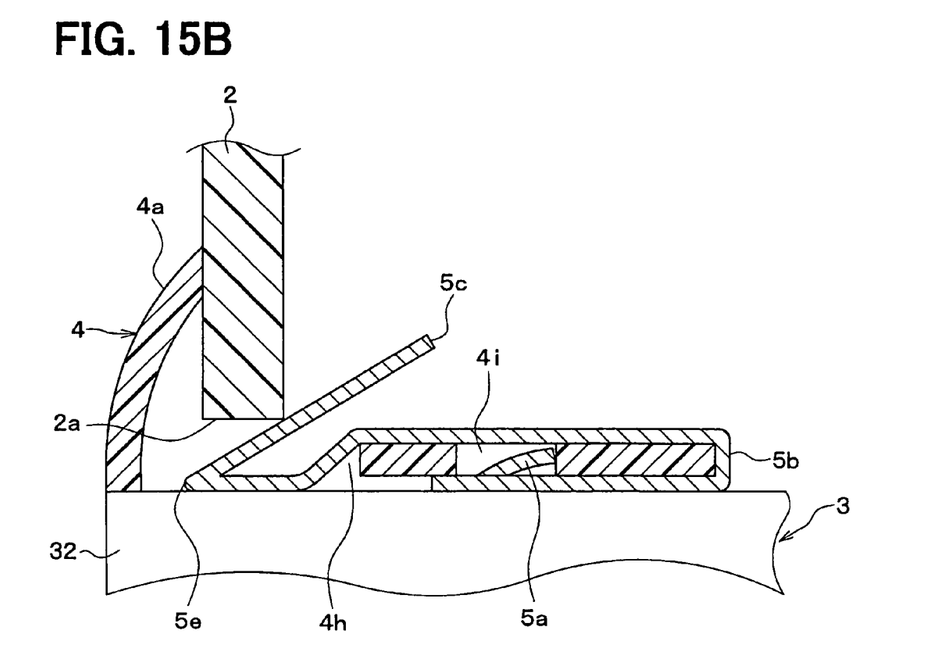

For example, the metal spring 5 is provided in a shape as shown in FIGS. 15A and 15B. That is, the metal spring 5 bent at the U-shaped part 5b is formed to have a bent portion 5e that enters the through hole 4h with a protrusion 5c extended therefrom. The metal spring 5 shaped in the above-described manner has the same effect as the spring 5 in the first and the second embodiments.

Figure 16:
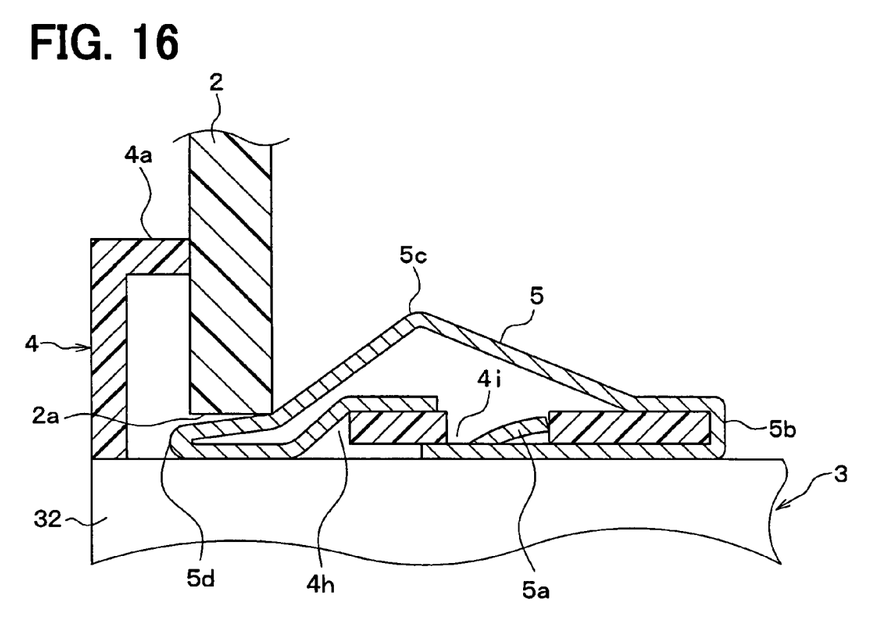
FIG. 16 shows an enlarged illustration of tips of the bezel in a modification of the second embodiment.

Further, the arc shape of the flange 4a may be replaced with other shapes. For example, as shown in FIG. 16, a rectangular shape of the flange 4a that radially outwardly extends from the axis of the bezel 4 with a wall that stands in parallel with the axis on the bumper 2 may be used to have the same effect.

Furthermore, the free end of the metal spring 5 may be formed to be positioned in the through hole 4h without being pushed by the wall of the hole 2a.

Furthermore, the bezel 4 and the sensor body 3 may be formed in a shape other than the cylindrical shape as described in the embodiments. That is, the bezel 4 may be in an oval shape, or in a polygonal tubular shape, and the body 3 may be in a corresponding shape of the hollow in the bezel 4.

Furthermore, the ultrasonic sensor 1 may be disposed on a vehicle part that is different from a bumper by having the structure described in the present disclosure.

Furthermore, the metal spring 5 may be integrally formed with the bezel 4 instead of being attached on the bezel 4 after forming the bezel 4.

Furthermore, the metal spring 5 may be replaced with other resilient body that is formed with a material different from the metal. The number of the metal spring 5 may be different from 4. The number of the springs 5 is preferably at least two. The arrangement of the springs 5 may not be equidistant as long as force balance between the springs 5 is maintained.

Such changes and modifications are to be understood as being within the scope of the present invention as defined by the appended claims.

What is claimed is:

1. An ultrasonic sensor comprising:
   a bezel in a pipe shape with an opening on one end and a hollow space housed therein;
   a sensor body having an insertion portion with an ultrasonic transducer disposed therein; and
   a spring, said spring being made of metal,
   wherein the bezel has a side wall having an opening of a through hole that connects an outside of the bezel and the hollow space,
   the side wall of the bezel has the spring disposed at a position of the through hole,
   insertion of the bezel into a hole portion of a vehicle component from an outside of the component accompanied by having the insertion portion of the sensor body being inserted from an inside of the component into the hollow space of the bezel causes a compressive deformation condition of the spring positioned between an outer wall of the insertion portion and a wall face of the hole portion,
   the spring is initially compressively deformed toward a center of the hole portion by the wall face of the hole portion when the bezel is inserted into the hole portion of the vehicle component.
   the spring is then compressively deformed toward an outside of the hole portion at a position between the outer wall of the insertion portion and the wall face of the hole portion when the insertion portion of the sensor body is inserted into the hollow space of the bezel, and
   the compressive deformation condition of the spring generates a reactive force of the spring that resiliently attaches the sensor body and the bezel on the wall face of the hole portion of the component.

2. The ultrasonic sensor as in claim 1,
   wherein the spring having contact with the wall face of the hole portion protrudes from the through hole to the hollow space of the bezel when the insertion portion is inserted in the hollow space, and
   a portion of the spring protruding in the hollow space of the bezel is pushed back by the outer wall of the insertion portion to cause the reactive force of the spring when the insertion portion is in a condition of insertion into the hollow space.

3. The ultrasonic sensor as in claim 1,
   wherein the spring has a fixed end that is fixed on the bezel and a free end that is displaceable by an external force,
   the free end is positioned in the through hole, and
   the reactive force of the free end in the compressive deformation condition attaches the sensor body and the bezel on the wall face of the hole portion.

4. The ultrasonic sensor as in claim 3,
   wherein the bezel has a flange formed at a rear end relative to an insertion direction of the bezel into the hole portion of the component for regulating an insertion amount of the bezel into the hole portion,
   the metal spring has the fixed end fixed at a front end of the bezel relative to the insertion direction and the free end positioned toward the rear end of the insertion direction, the free end of the metal spring has a convex portion that inclines relative to the insertion direction of the bezel, and the convex portion applying the reactive force and the flange hold the component when the bezel is inserted in the hole portion of the component.

5. The ultrasonic sensor as in claim 4, wherein the flange and the component defines an empty space interposed therebetween, and the spring protrudes from an outer face of the component into the empty space.

6. The ultrasonic sensor as in claim 5, wherein the flange is at least partially larger than the hole portion.

7. The ultrasonic sensor as in claim 4, wherein the spring is formed by bending a rod shape member, the rod member has the fixed end and the free end, the free end has a bending portion that is formed by bending a tip of the free end toward the fixed end, and the tip of the free end is prevented from entering the through hole by being held by a wall that defines the through hole.

8. The ultrasonic sensor as in claim 4, wherein the side wall of the bezel has a nail that prevents the bezel from falling from the hole portion at a position that is apart from the flange by at least an amount of the thickness of the component.

9. The ultrasonic sensor as in claim 1, wherein the bezel is in a cylinder shape, and the insertion portion of the sensor body is in a column shape.

10. The ultrasonic sensor as in claim 9, wherein plural pieces of the spring are positioned equiangularly around a center of the bezel.

11. An ultrasonic sensor comprising:

a bezel in a pipe shape with an opening on one end and a hollow space housed therein;

a sensor body having an insertion portion with an ultrasonic transducer disposed therein; and a spring, the spring being made of metal, wherein the bezel has a side wall having an opening of a through hole that connects an outside of the bezel and the hollow space, the side wall of the bezel has the spring disposed at a position of the through hole, insertion of the bezel into a hole portion of a vehicle component from an outside of the component accompanied by having the insertion portion of the sensor body being inserted from an inside of the component into the hollow space of the bezel causes a compressive deformation condition of the spring positioned between an outer wall of the insertion portion and a wall face of the hole portion, the snring is first compressively deformed toward a center of the hole portion by the wall face of the hole portion when the bezel is inserted into the hole portion of the vehicle component.

the spring is then compressively deformed toward an outside of the hole portion at a position between the outer wall of the insertion portion and the wall face of the hole portion when the insertion portion of the sensor body is inserted into the hollow space of the bezel, the compressive deformation condition of the spring generates a reactive force of the spring that resiliently attaches the sensor body and the bezel on the wall face of the hole portion of the component, a portion of the bezel is formed in a shape that contacts the vehicle component at a tip part, the portion of the bezel and the component defines an empty space interposed therebetween, and the spring protrudes from an outer face of the component into the empty space.

12. The ultrasonic sensor as in claim 11, wherein the spring having contact with the wall face of the hole portion protrudes from the through hole to the hollow space of the bezel when the insertion portion is inserted in the hollow space, and a portion of the spring protruding in the hollow space of the bezel is pushed back by the outer wall of the insertion portion to cause the reactive force of the spring when the insertion portion is in a condition of insertion into the hollow space.

13. The ultrasonic sensor as in claim 11, wherein the spring has a fixed end that is fixed on the bezel and a free end that is displaceable by an external force, the free end is positioned in the through hole, and the reactive force of the free end in the compressive deformation condition attaches the sensor body and the bezel on the wall face of the hole portion.

14. The ultrasonic sensor as in claim 11, wherein the portion of the bezel is a flange that is at least partially larger than an opening of the hole portion.

15. The ultrasonic sensor as in claim 14, wherein the flange is formed at a rear end relative to an insertion direction of the bezel into the hole portion of the component for regulating an insertion amount of the bezel into the hole portion, the metal spring has the fixed end fixed at a front end of the bezel relative to the insertion direction and the free end positioned toward the rear end of the insertion direction, the free end of the metal spring has a convex portion that inclines relative to the insertion direction of the bezel, and the convex portion applying the reactive force and the flange hold the component when the bezel is inserted in the hole portion of the component.

16. The ultrasonic sensor as in claim 11, wherein the shape of the portion of the bezel is an arc shape in its cross section, and the arc shape has contact with the component at a farthest portion from a center of the bezel.

17. The ultrasonic sensor as in claim 11, wherein the shape of the portion of the bezel is a bent shape in its cross section, and the arc shape has contact with the component at a farthest portion from a center of the bezel.

18. The ultrasonic sensor as in claim 11, wherein the bezel is in a cylinder shape, and the insertion portion of the sensor body is in a column shape.

19. The ultrasonic sensor as in claim 17, wherein plural pieces of the spring are positioned equiangularly around a center of the bezel.

* * * * *